United States Patent
Morita et al.

(10) Patent No.: US 10,332,076 B2
(45) Date of Patent: Jun. 25, 2019

(54) METHOD AND SYSTEM FOR PREDICTING AND POSTING FUTURE CALENDAR EVENTS

(71) Applicant: Sony Corporation, Minato-ku (JP)

(72) Inventors: Masahiro Morita, Kanagawa (JP); Atsushi Ishihara, Tokyo (JP); Yoshinori Kurata, Ibaraki (JP); Hajime Senuma, Kanagawa (JP); Masayuki Takada, Tokyo (JP); Yoshiki Takeoka, Tokyo (JP); Shouichi Doi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1214 days.

(21) Appl. No.: 14/291,556

(22) Filed: May 30, 2014

(65) Prior Publication Data

US 2015/0006220 A1    Jan. 1, 2015

(30) Foreign Application Priority Data

Jun. 27, 2013    (JP) .................................. 2013-134790

(51) Int. Cl.
*G06Q 10/10*    (2012.01)
*G06Q 10/06*    (2012.01)

(52) U.S. Cl.
CPC .............................. *G06Q 10/1095* (2013.01); *G06Q 10/063116* (2013.01)

(58) Field of Classification Search
CPC ......... G06Q 10/063116; G06Q 10/109; G06Q 10/1091; G06Q 10/1093; G06Q 10/1095; G06Q 10/1097
See application file for complete search history.

(56) References Cited

U.S. PATENT DOCUMENTS

| 7,970,793 | B2* | 6/2011 | Davia | G06Q 10/109 707/793 |
| 2004/0054726 | A1* | 3/2004 | Doss | G06Q 10/109 709/205 |
| 2004/0064567 | A1* | 4/2004 | Doss | G06Q 10/063114 709/228 |
| 2004/0064585 | A1* | 4/2004 | Doss | G06Q 10/063116 709/246 |
| 2006/0069686 | A1* | 3/2006 | Beyda | G06Q 10/109 |

(Continued)

FOREIGN PATENT DOCUMENTS

JP    2011-180908    9/2011

OTHER PUBLICATIONS

G. Pingali and R. Jain, "Electronic Chronicles: Empowering Individuals, Groups, and Organizations," 2005 IEEE International Conference on Multimedia and Expo, Amsterdam, 2005, pp. 1540-1544. doi: 10.1109/ICME.2005.1521727.*

(Continued)

*Primary Examiner* — Timothy Padot
*Assistant Examiner* — George H Walker, III
(74) *Attorney, Agent, or Firm* — Xsensus LLP

(57) ABSTRACT

There is provided an information processing device including a schedule acquisition unit configured to acquire a schedule registered by a user, an action-history acquisition unit configured to acquire an action history of the user, and a past-schedule correction unit configured to correct a past schedule among the schedule on the basis of the action history.

17 Claims, 16 Drawing Sheets

(56) References Cited

U.S. PATENT DOCUMENTS

| | | | |
|---|---|---|---|
| 2009/0199192 A1* | 8/2009 | Laithwaite | G06Q 10/06 718/104 |
| 2010/0017216 A1* | 1/2010 | Chakra | G06Q 10/06311 705/1.1 |
| 2011/0072085 A1* | 3/2011 | Standley | G06F 17/30038 709/204 |
| 2014/0052675 A1* | 2/2014 | Ko | G06N 5/02 706/12 |

OTHER PUBLICATIONS

Shu Hui Tee, Sheng Chyan Lee, Simon Hoh, Chin Chin Wong and Han Lun Tan, "An initial framework for predictive end-user application trigger," 2008 International Symposium on Information Technology, Kuala Lumpur, 2008, pp. 1-4. doi: 10.1109/ITSIM.2008.4631715.*

* cited by examiner

METHOD AND SYSTEM FOR PREDICTING AND POSTING FUTURE CALENDAR EVENTS

CROSS REFERENCE TO RELATED APPLICATIONS

This application claims the benefit of Japanese Priority Patent Application JP 2013-134790 filed Jun. 27, 2013, the entire contents of which are incorporated herein by reference.

BACKGROUND

The present disclosure relates to an information processing device, an information processing method, and a program.

Managing a schedule of a user by using an information processing terminal is already widespread. For example, JP 2011-180908A describes that, when receiving registration of a schedule from a user, complement action is automatically registered, the complement action complementing action registered in the schedule.

SUMMARY

A schedule is an action plan that is explicitly registered by a user, and accordingly the schedule is useful when the information processing terminal generates action support information about a user, for example. However, for example, with regard to schedules registered by the user, a plurality of schedules are registered in a same time (competition), or same schedules or places are described by using different words (writing variation). Accordingly such schedule is not necessarily useful data. Recently, sharing schedules among a plurality of users has become popular. However, in the case where a plan registered by another user is included in a schedule, a matter of competition or writing variation may be increased.

On the other hand, as a way to understand a user action, action recognition technology is also known, the action recognition technology using detection results from an acceleration sensor, a GPS sensor, and the like included in a terminal device carried by a user. However, a lack of information about a user action grasped by the action recognition technology may occur when, for example, some sensors are not detected in a basement, or the user does not carry the terminal device. In addition, it is difficult to determine what each recognized action means for the user.

Accordingly, the present disclosure proposes a novel and improved information processing device, information processing method, and program that can understand user actions more accurately by combining and utilizing schedules registered by a user and action histories of the user.

According to an embodiment of the present disclosure, there is provided an information processing device including a schedule acquisition unit configured to acquire a schedule registered by a user, an action-history acquisition unit configured to acquire an action history of the user, and a past-schedule correction unit configured to correct a past schedule among the schedule on the basis of the action history.

According to an embodiment of the present disclosure, there is provided an information processing method including acquiring a schedule registered by a user, acquiring an action history of the user, and correcting, by a processor, a past schedule among the schedule on the basis of the action history.

According to an embodiment of the present disclosure, there is provided a program for causing a computer to achieve acquiring a schedule registered by a user, acquiring an action history of the user, and correcting a past schedule among the schedule on the basis of the action history.

According to one or more of embodiments of the present disclosure, user actions can be understood more accurately by combining and utilizing schedules registered by a user and action histories of the user.

DETAILED DESCRIPTION OF THE EMBODIMENT(S)

Figure 1:
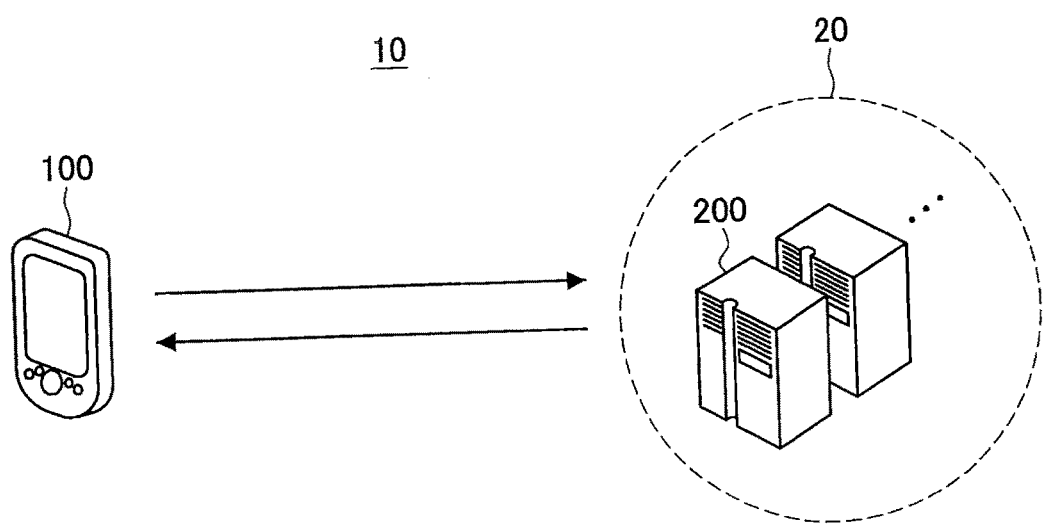
FIG. 1 is a diagram showing a schematic configuration of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. First Embodiment
1-1. System Configuration
1-2. Functional Configuration
1-3. Example of Detailed Processing
2. Second Embodiment
2-1. Functional Configuration
2-2. Example of Detailed Processing
3. Supplemental Remarks
(1. First Embodiment)
(1-1. System Configuration)

FIG. 1 is a diagram showing a schematic configuration of an information processing system according to a first embodiment of the present disclosure. Referring to FIG. 1, a system 10 includes a client device 100 and a server device 200. The server 20 includes a single server device 200, or a plurality of cooperative server devices 200. The server 20 communicates with the client device 100 through a network, and provides the client device 100 with a service.

(Configuration of Client Device)

Figure 2:
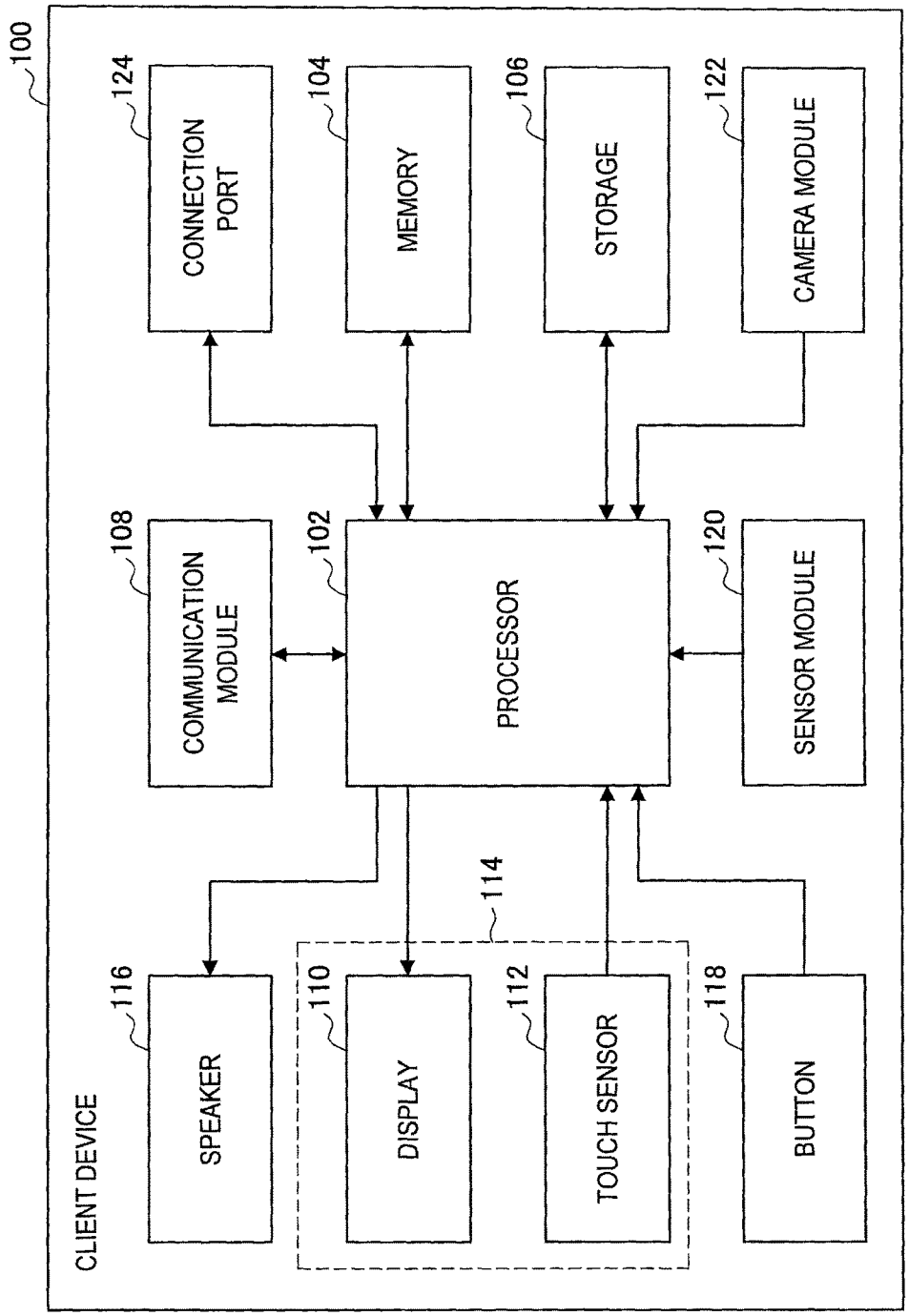
FIG. 2 is a block diagram showing a schematic configuration of a client device according to a first embodiment of the present disclosure.

FIG. 2 is a block diagram showing a schematic configuration of the client device according to the first embodiment of the present disclosure. Referring to FIG. 2, the client device 100 may include a processor 102, memory 104, storage 106, a communication module 108, a touchscreen 114 having a display 110 and a touch sensor 112, a speaker 116, a button 118, a sensor module 120, a camera module 122, and a connection port 124.

The processor 102 is implemented by a central processing unit (CPU), a digital signal processor (DSP), and an application specific integrated circuit (ASIC) for example, and achieves diverse functions by operating in accordance with a program stored in the memory 104. By controlling each part of the client device 100, the processor 102 acquires various types of input, and provides various types of output. Details of functions achieved by the processor 102 will be described later.

The memory 104 is implemented by semiconductor memory used as random access memory (RAM) or read only memory (ROM) for example. The memory 104 stores a program for causing the processer 102 to operate, for example. The program may be read from the storage 106 and may be temporarily loaded into the memory 104, or may be continuously stored into the memory 104, for example. For another example, the program may be received by the communication module 108, and may be temporarily loaded into the memory 104. The memory 104 further stores, temporarily or continuously, various types of data generated by processing of the processor 102.

The storage 106 is implemented by flash memory or a storage device utilizing a magnetic disk such as a hard disk drive (HDD), an optical disc, a magneto-optical disc, or the like. The storage 106 continuously stores a program for causing the processor 102 to operate, and various types of data generated by processing of the processor 102, for example. The storage 106 may include a removable medium, or may be built in the client device 100.

The communication module 108 is implemented by various types of communication circuits which performs wired or wireless network communications on the basis of control performed by the processor 102. In the case of performing the wireless communication, the communication module 108 may include an antenna. The communication module 108 performs a network communication according to a communication standard of an interne, a local area network (LAN), or Bluetooth (registered trademark), for example. The communication module 108 can transmit information generated by the client device 100 to the server 20, another client device 100, or the like, and can receive various types of information from the sever 20 or the another client device 100.

The display 110 is implemented by a liquid crystal display (LCD) or an organic electro-luminescence (EL) display, for example. The display 110 displays various types of information as images in accordance with control performed by the processor 102. In this embodiment, the touchscreen 114 including the display 110 and the touch sensor 112 is used as an input unit. Accordingly, the display 110 displays a graphical user interface (GUI) image which can be operated by the touch sensor 112. Detailed example of an image displayed on the display 110 will be described later.

The touch sensor 112 is implemented by a capacitive sensor that is arranged at a position corresponding to the display 110, for example. The touch sensor 112 of the display 110 acquires a touch operation performed by a user on a GUI image displayed on the display 110. The touch operation acquired by the touch sensor 112 may include diverse patterns made by touches performed by the user, such as tapping, dragging and flicking. Note that, in another embodiment, another pointing device such as a mouse or a touchpad may be adopted in addition or instead of the touch sensor 112.

The speaker 116 outputs the various types of information as sound in accordance with control performed by the processor 102. The button 118 is arranged on a case of the client device 100, and acquires a pressing operation performed by a user. As described above, in the client device 100, diverse output devices and input devices may be included in addition to or instead of the touchscreen 114

The sensor module 120 is implemented by various types of sensors such as an acceleration sensor, a gyro sensor, a geomagnetic sensor, a photosensor, a pressure sensor, and a sound sensor, and processing circuits that pertain to the sensors. For example, the sensor module 120 acquires not only information about a state of the client device 100 itself such as acceleration acting on the case of the client device 100 and orientation of the case, but also information about environment surrounding the client device 100 such as brightness and noise around the client device 100. In addition, the sensor module 120 may include a global positioning system (GPS) sensor which receives a GPS signal and measures latitude, longitude, and height of the client device 100.

The camera module 122 is implemented by image sensors such as a charge coupled device (CCD) or a complementary metal oxide semiconductor (CMOS), an optical system such as a lens which controls image formation of a subject image on the image sensors, and a drive circuit for causing the image sensors and the optical system to drive. The image sensors image the subject image so as to generate a still image or a moving image, and the camera module 122 provides the processor 102 with the still image or the moving image as image data.

The connection port 124 is a port for directly connecting the client device 100 with an external device. For example, the connection port 124 is implemented by a universal serial bus (USB) port, an IEEE 1394 port, or a high-definition multimedia interface (HDMI) (registered trademark) port. The external device connected to the connection port 124 may be a display device (for example, external display), an input device (for example, keyboard and mouse), a storage device (for example, external HDD), or the like. However, the external device is not limited thereto.

The client device 100 including structural elements described above may be a smartphone, a tablet terminal, various types of personal computer (PC), or the like. Moreover, the client device 100 may be a media player, a video game console, a television, or the like. In this embodiment, the client device 100 can achieve functions of the information processing apparatus according to the embodiment of the present disclosure, by itself or in cooperation with the server device 200.

(Configuration of Server Device)

Figure 3:
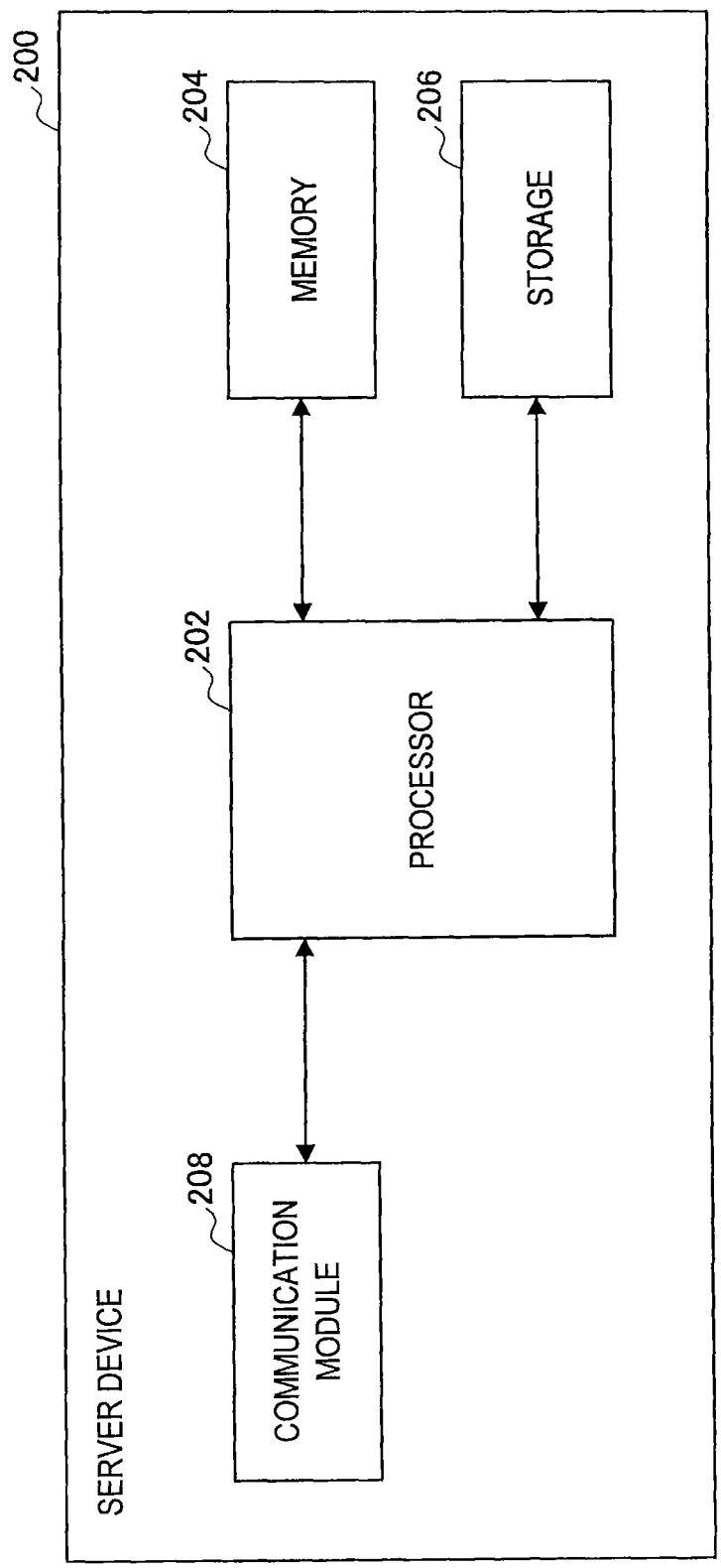
FIG. 3 is a block diagram showing a schematic configuration of a server device according to a first embodiment of the present disclosure.

FIG. 3 is a block diagram showing a schematic configuration of a server device according to a first embodiment of the present disclosure. Referring to FIG. 3, the server device 200 can include a processor 202, memory 204, storage 206, and a communication module 208.

In the following explanation, the server device 200 is described as a device whose main purpose is to provide the client device 100 with a service through a network, and which does not perform acquisition and the like of information output to a user and operation input, except in a case where the service itself is a setting operation. However, the server device 200 is not limited to such device. For example, the server device 200 may be a device having a configuration similar to the client device 100. That is, for example, it is possible that a desktop PC installed in a house of a user functions as the server device 200, and a smartphone carried by the user functions as the client device 100.

The processor 202 is implemented by a CPU, a DSP, and an ASIC for example, and achieves diverse functions by operating in accordance with a program stored in the memory 204. The processor 202 acquires information transmitted from the client device 100 through the communication module 208, and performs various types of processing on the basis of the information. The processor 202 transmits information about a processing result to the client device 100 through the communication module 208. The server device 200 may be able to provide a plurality of client devices 100 with services. Accordingly, the processor 202 may perform processing based on the information transmitted from the respective client devices 100, and may transmit information about processing results with other client devices 100 that are different from the client devices 100 which transmitted the original information.

The memory 204 is implemented by semiconductor memory used as RAM or ROM for example. The memory 204 stores a program for causing the processer 202 to operate, for example. The program may be read from the storage 206 and may be temporarily loaded into the memory 204, or may be continuously stored into the memory 204, for example. For another example, the program may be received by the communication module 208, and may be temporarily loaded into the memory 204. The memory 204 further stores, temporarily or continuously, various types of data generated by processing of the processor 202.

The storage 206 is implemented by flash memory or a storage device utilizing a magnetic disk such as an HDD, an optical disc, a magneto-optical disc, or the like. The storage 206 continuously stores a program for causing the processor 202 to operate, and various types of data generated by processing of the processor 202, for example. The storage 206 may include a removable medium, or may be built in the server device 200.

The communication module 208 is implemented by various types of communication circuits which performs wired or wireless network communications in accordance with control performed by the processor 202. In the case of performing the wireless communication, the communication module 208 may include an antenna. The communication module 208 performs a network communication according to a communication standard of an internet, a LAN, or Bluetooth (registered trademark), for example. The communication module 208 can transmit information generated by the server device 200 to the client device 100, another server device 200, or the like, and can receive various types of information from the client device 100 or the another server device 200. In the case where the server 20 includes a plurality of cooperative server devices 200, processers 202 of the respective server devices 200 exchange information about processing with each other through communication modules 208.

(1-2. Functional Configuration)

Figure 4:
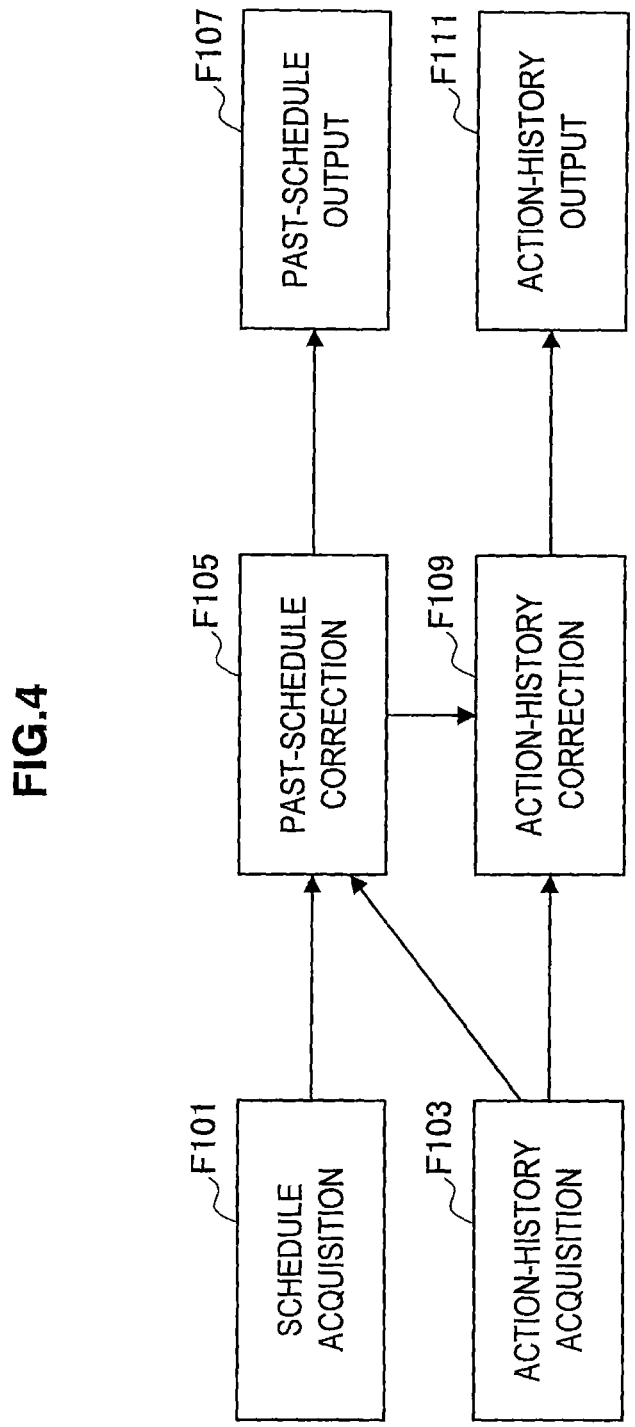
FIG. 4 is a block diagram showing a schematic functional configuration of an information processing system according to a first embodiment of the present disclosure.

FIG. 4 is a block diagram showing a schematic functional configuration of an information processing system according to a first embodiment of the present disclosure. Referring to FIG. 4, the present embodiment achieves a schedule acquisition function (F101), an action-history acquisition function (F103), a past-schedule correction function (F105), a past-schedule output function (F107), an action-history correction function (F109), and an action-history output function (F111).

The all functions F101 to F111 may be achieved by the processor 102 of the client device 100 or by the processor 202 of the server device 200. On the other hand, some of the functions F101 to F111 may be achieved by the processor 102 of the client device 100, and the other functions may be achieved by the processor 202 of the server device 200. In this case, the processor 102 and the processor 202 cooperate with each other through a network communication. In the case where the server 20 includes a plurality of server devices 200, at least some of the functions F101 to F111 may be achieved by being dispersed to the plurality of server devices 200, or one of the server devices 200 may be achieved the plurality of functions.

The schedule acquisition function (F101) acquires a schedule registered by a user. For example, the user acquires the schedule registered by using a calendar application provided on the client device 100. The calendar application may be performed by the processor 102 of the client device 100, or may be performed by the processor 202 of the server device 200, and may be accessed as something like a web application by the client device 100, for example. The schedule may include event information defined by time information such as "2013/06/05 (Wed) from 11:00 to 12:00" and content information such as "Regular Meeting at Head Office". In addition, the event information may include information indicating event participants.

Here, the event information is generally registered before performing the event. In the following explanation, a schedule including event information whose performance time has not yet come is referred to as a "future schedule". On the other hand, a schedule including event information whose performance time has already come is referred to as a "past schedule" in the following explanation. The schedule acquisition function (F101) may acquire both of the future schedule and past schedule.

More specifically, from among registered schedules, a past schedule may be selectively acquired, or both a future schedule and a past schedule are acquired and then, when performance time of event information has come, the future schedule may be changed to a past schedule. In the case where the acquired schedule is updated in a calendar application from which the schedule is acquired together with the future schedule and the past schedule, the schedule acquisition function (F101) updates the schedule accordingly.

The action-history acquisition function (F103) acquires an action history of a user of the client device 100, the action history being recognized on the basis of information acquired by the sensor module 120 of the client device 100, for example. The action history may be acquired from a recognition result obtained by the action recognition function which is achieved by the processor 102 of the client device 100 or by the processor 202 of the server device 200, for example. For another example, the action history may be acquired from results of transmitting the information acquired from the sensor module 120 to an action recognition server external to the system 10 and performing action recognition processing based on the information received by the action recognition server.

The action history of the user may include a result of recognizing a user movement such as staying, walking, a transfer on a train, or a transfer in a car, on the basis of acceleration acting on the case of the client device 100, for example. Moreover, the action history may include a result of recognizing a higher-level action such as working, staying at home, or shopping, by combining a result of recognizing the user movement with location information of the user acquired by the GPS sensor and the like. Note that, a detailed explanation of such action-recognition processing is omitted here, because the processing is already known in JP2010-198595A and JP2011-81431A.

Figure 5:
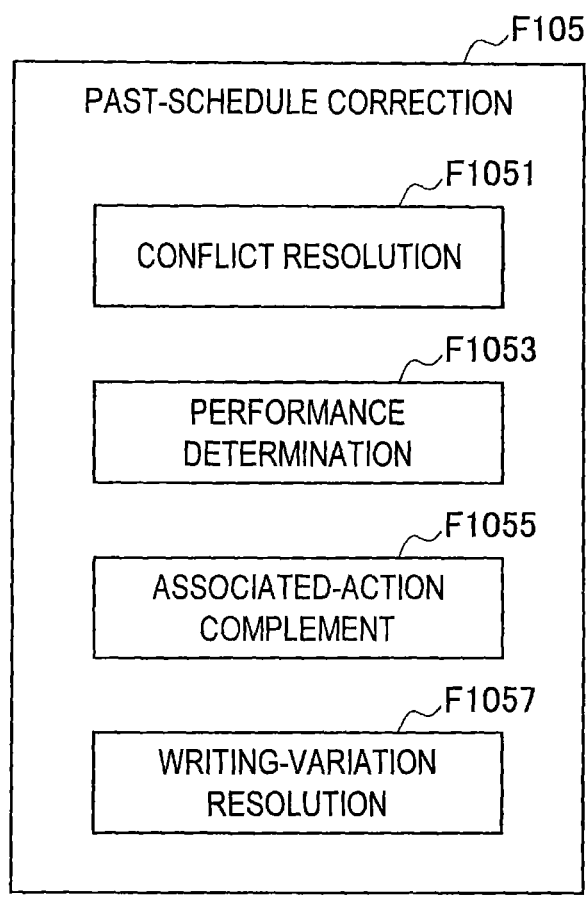
FIG. 5 is a diagram showing details of a past-schedule correction function according to a first embodiment of the present disclosure.

On the basis of the action history of the user acquired by the action-history acquisition function (F103), the past-schedule correction function (F105) corrects a past-schedule among schedules acquired by the schedule acquisition function (F101). FIG. 5 shows details of the past-schedule correction function (F105). For example, the past-schedule correction function (F105) includes a conflict resolution function (F1051), a performance determination function (F1053), an associated-action complement function (F1055), and a writing-variation resolution function (F1057). Details of the functions will be described below.

In the case where pieces of the event information included in a past schedule compete with each other, the conflict resolution function (F1051) determines which event information corresponds to the actually-performed event among the event information on the basis of an action history of the user, and deletes or nullifies event information other than actually-performed event information in order to enable conflict resolution. Occasionally it is determined that events corresponding to any event information are not performed. Alternatively, the conflict resolution function (F1051) may determine that pieces of event information competing with each other in the past-schedule means a same event actually, and may integrate the pieces of event information in order to enable conflict resolution. When identifying a plurality of event information indicating a same event, a later-described processing result of the writing-variation resolution function (F1057) may be used, for example.

For example, event information about a periodically-repeating event A (for example, weekly events or monthly events) and event information about an event B performed just one time compete with each other and registered in a future schedule of an calendar application. In such a case, even if the event B is actually performed, the event information about the event A that the user does not perform is rarely deleted in advance. This may be because, for example, the user implicitly recognizes a relation between the event A and event B (for example, the event B is set since the event A is canceled in the week/month, or the event A is canceled and the event B is set in the week/month since the event A is not important) and there is no confusion even if the event information about the event A is not deleted. In addition, event information about periodically-repeating events are often set in a lump in a calendar application. In many cases, operation of the application in order to delete one of the periodically-repeating events becomes complicated.

Furthermore, in the case where a plurality of users shares schedules by using calendar applications, it may be occurred, in the future schedule, that event information about an event which is difficult for a user to join because of competition is registered by another user, or a plurality of duplicate event information meaning a same event is registered by the plurality of users. In such cases, the event information of an event which the user does not perform or the duplicate event information is rarely deleted in advance. This may be because, for example, the user implicitly recognizes a relation between the event information registered by himself/herself and the event information registered by the other users (for example, the event information registered by the other users can be ignored in the case where the event information registered by the other users competes with the event information registered by himself/herself) and there is no confusion even if the event information about the event which is not performed is not deleted. In many cases, the event information registered by the other users designates a plurality of participants, and operation of the application in order to delete one of the applicants becomes complicated.

In addition, after performance time of the event information has come and a future schedule becomes a past schedule, the user merely edits the schedule in order to perform competition resolution of event information in the schedule. This is because a schedule is inherently designed to understand future plans. For example, in many calendar applications, schedules before current time or previous days are not displayed unless a display area is intentionally changed.

As described above, the duplication of the event information remained in the past-schedule is resolved by the conflict resolution function (F1051). Accordingly, the past schedule can be corrected to information close to a history of events performed by a user. Note that, there will be described later how useful such corrected past schedule is.

On the basis of the action history of the user, the performance determination function (F1053) determines whether or not event information included in the past schedule corresponds to an actually-performed event. As to a difference from the conflict resolution function (F1051), the performance determination function (F1053) determines whether or not events corresponding to respective event information were performed despite whether or not the respective event information compete with each other. For example, in the case of the periodically-repeating event as described in the above example, even if the user cancels an event at a certain week/month, event information of the event that the user cancels are rarely deleted since respective events are registered in a lump. In addition, in the case where a schedule is shared and event information is registered by another user, the event information of an event in which the user did not participate is rarely deleted because a plurality of participants are registered or the user did not notice the registration of the event information in the first place. According to the above reasons, the performance determination function (F1053) deletes the event information from the past schedule or nullifies the event information on the past schedule, the event information corresponding to the event that remains on the past schedule but that is not performed actually. Accordingly, in a same way as the conflict resolution function (F1051), the past schedule can be corrected to information close to the history of events performed by the user.

The associated-action complement function (F1055) adds, to a past schedule, second event information corresponding to a second event (associated action) that occurred in association with a first event corresponding to first event information included in the past schedule. For example, the second event (associated action) may be a transfer to a place where the first event is held or preparation of a material for the first event (conference, for example). Since the user implicitly recognizes the second event (associated action) associated with the first event for example, it is rare that the user explicitly registers the second event as the event information. However, in the case of correcting the action history as described later, the second event information indicating the second event (associated action) can be useful.

The writing-variation resolution function (F1057) resolves writing variation in event information included in the past schedule. For example, a name and venue of an event in the event information is often registered in different names in some cases. For example, "Regular Group Meeting" may be sometimes registered as "Regular Meeting", and may be sometimes registered as "Group Meeting". In a similar way, "Head Office Conference Room 101" may be sometimes registered as "Head Office", and may be sometimes registered as "Conference Room 101". In the case where the schedule is shared and another user can register event information, writing variation may be larger.

In this embodiment, it becomes easier for users to use a past schedule described later since the writing-variation resolution function (F1057) resolves the writing variation. The writing-variation resolution function (F1057) resolves writing variation in event information by comparing a location or event content indicated by an action history with a location or event content indicated by the event information. That is, the action history may be used for estimating what words included in the writing variation in the event information means. For writing-variation resolution, machine learning is generally applied. At this time, a case where different words mean a same thing is identified on the basis of an action history of the user, and accordingly accuracy of leaning can be improved.

Referring to FIG. 4 again, the past-schedule output function (F107) outputs a past schedule corrected by the past-schedule correction function (F105). The corrected past schedule may be displayed on the display 100 of the client device 100 and may be referred when the user looks back past actions, for example. For another example, the past schedule may be associated with data about events such as a conference included as event information, and may be utilized for transmitting a minute to participants of the event. In this case, if the past-schedule correction function (F105) specifies users who actually attends a conference, it may be possible that the minute is transmitted to limited users who actually attends the conference, or that a handout and the minute is transmitted to users whose schedule has event information about the conference but who did not attend the conference actually.

The action-history correction function (F109) corrects an action history of the user which the action-history acquisition function (F103) acquires on the basis of the past schedule corrected by the past-schedule correction function (F105). As described above, the action history is a history of actions of the user recognized on the basis of information acquired from the sensor module 120 of the client device 100, for example.

For example, by using a timestamp and the like, the action-history correction function (F109) associates the action history of the user acquired by the action-history acquisition function (F103) with the past schedule corrected by the past-schedule correction function (F105), and complements a name of a place defined in the action history on the basis of the past schedule. In addition, with regards to a time period in which the GPS sensor does not detect its location because the user is in the basement, or in which an action-history is not acquired because the user leaves the client device 100 on a desk and goes another place, the action-history correction function (F109) may complement the action history on the basis of the past schedule.

The action-history output function (F111) outputs the action history corrected by the action-history corrected function (F109). The corrected action history may be displayed on the display 110 of the client device 100, and may be referred when the user looks back the past actions, for example. For another example, the corrected action history may be accumulated and analyzed statistically, and may be utilized for determination of an action pattern of the user.

(1-3. Example of Detailed Processing)
(First Example)

Figure 6:
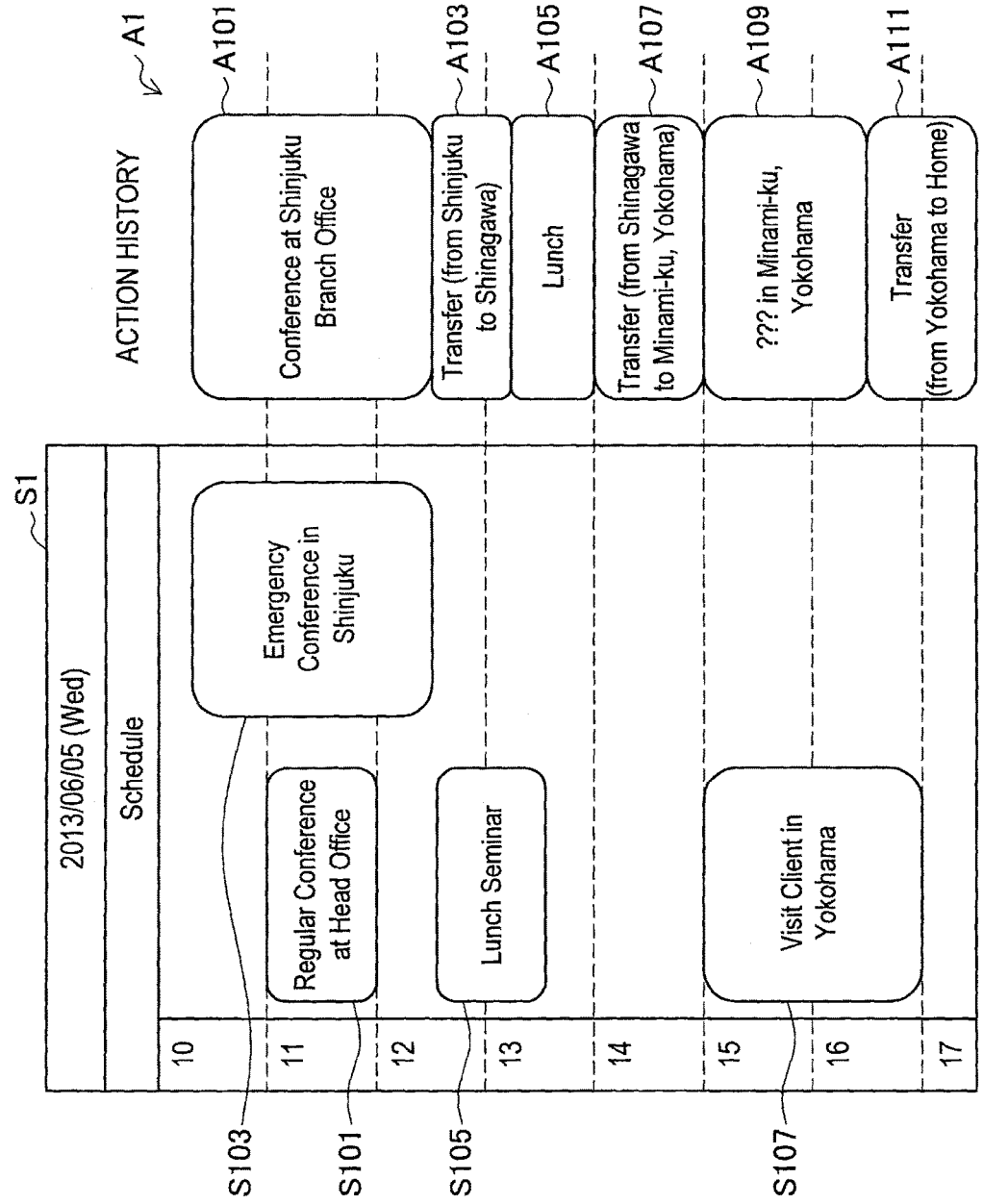
FIG. 6 is a diagram showing a first example of detailed processing according to a first embodiment of the present disclosure.
Figure 7:
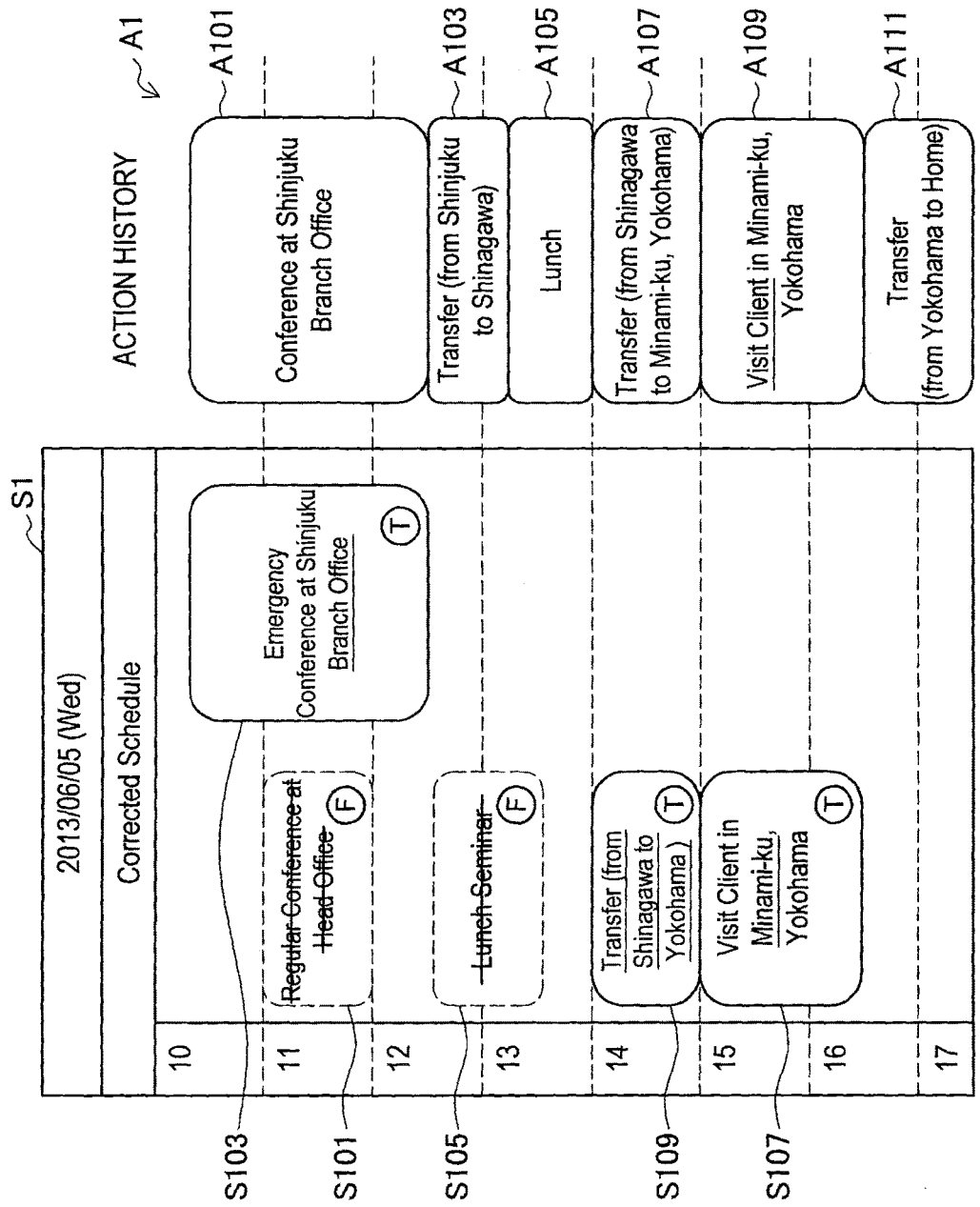
FIG. 7 is a diagram showing a first example of detailed processing according to a first embodiment of the present disclosure.

FIGS. 6 and 7 are diagrams showing a first example of detailed processing according to a first embodiment of the present disclosure. FIG. 6 shows a past schedule and action history before correction, and FIG. 7 shows the corrected past schedule and corrected action history.

Referring to FIG. 6, event information S101 to S107 are registered in a past schedule S1. In addition, action histories A101 to A111 are registered in an action history A1. In the schedule S1, the event information S101 (Regular Conference at Head Office from 11:00 to 12:00) competes with the event information S103 (Emergency Conference in Shinjuku from 10:30 to 12:30). In the action history A1, a user location can be detected in the action history A109 (??? in Minami-ku, Yokohama from 15:00 to 16:30), but what the user did there is not identified.

The past-schedule correction function (F105) corrects the past schedule S1, and the action-history correction function (F109) corrects the action history A1. The result is shown in FIG. 7.

Referring to FIG. 7, the conflict resolution function (F1051) included in the past-schedule correction function (F105) resolves the competition among the event information S101 and S103, and determines that the event (emergency conference) of the event information (S103) is performed. Here, the conflict resolution function (F1051) compares a user location at a time period (from 10:30 to 12:30) corresponding to the event information S101 and S103 indicated in the action history A101 with locations indicated in the respective event information. Here, a user position indicated in the action history A101 is "Shinjuku Branch Office". A location indicated in the event information S101 is "Head Office", and a location indicated in the event information S103 is "Shinjuku". Here, by the writing-variation resolution function (F1057), it is recognized that the "Shinjuku" in the event information S103 indicates the "Shinjuku Branch Office". Accordingly, the location indicated in the event information S103 is matched with the user location indicated in the action history A1. On this basis, the conflict resolution function (F1051) may determine that the event information S103 corresponds to the actually-performed event. The event information S101 corresponding to the event (regular meeting) that was not performed may be deleted from the past schedule S1, or may be nullified and remain on the past schedule S1 as the example shown in FIG. 7.

Further referring to FIG. 7, the performance determination function (F1053) included in the past-schedule correction function (F105) determines that an event (Lunch Seminar) corresponding to the event information S105 was not performed. For example, on the basis that a transfer of the user from Shinjuku to Shinagawa is recorded as the action history A103 in the time period (from 12:30 to 13:15) corresponding to the event information S105, the performance determination function (F1053) may determine that the event corresponding to the event information S105 was not performed. In a similar way to the event information S101, the event information S105 corresponding to the event (Lunch Seminar) that was not performed may be deleted from the schedule S1, or may be nullified and remain on the schedule S1 as the example shown in FIG. 7.

Further referring to FIG. 7, the associated-action complement function (F1055) included in the past-schedule correction function (F105) complements the event information S109 (transfer from Shinagawa to Yokohama) before the event information S107 (visit client in Yokohama). For example, the associated-action complement function (F1055) may complement the event information S109 on the basis that the user transfer from Shinagawa to Yokohama was recorded as the action history A107 before the time period (from 15:00) corresponding to the event information S107, and that a place where the user usually works is estimated to be Shinagawa from an action history (not shown) of another day. In addition, in the example shown in FIG. 7, the writing-variation resolution function (F1057) corrects place information "Yokohama" included in the event information S107 to "Minami-ku, Yokohama". Additionally, in accordance with an ending time (16:30) of the action history A107, an ending time (originally 17:00) of the corresponding event information S107 may be corrected.

On the other hand, referring to FIG. 7, the action-history correction function (F109) complements the action history A109 that what the user did is not recognized in the action history A1, on the basis of the event information S107 (visit client) in the corrected schedule S1 registered at corresponding time period (from 15:00) so as to recognize that the user action means "Visit Client".

The schedule S1 and the action history A1 that are corrected in the above-described ways may be displayed on the display 110 of the client device 100 by the past-schedule output function (F107) and the action-history output function (F111), for example. At this time, the display 110 may display an image such as the schedule S1 and the action history A1 shown in FIG. 7. It is also possible that the schedule S1 displays symbols T on the event information (S103, S107, and S109) corresponding to the performed events and displays symbols F on the event information (S101 and S105) corresponding to the non-performed events, for example as shown in FIG. 7.

(Second Example)

Figure 8:
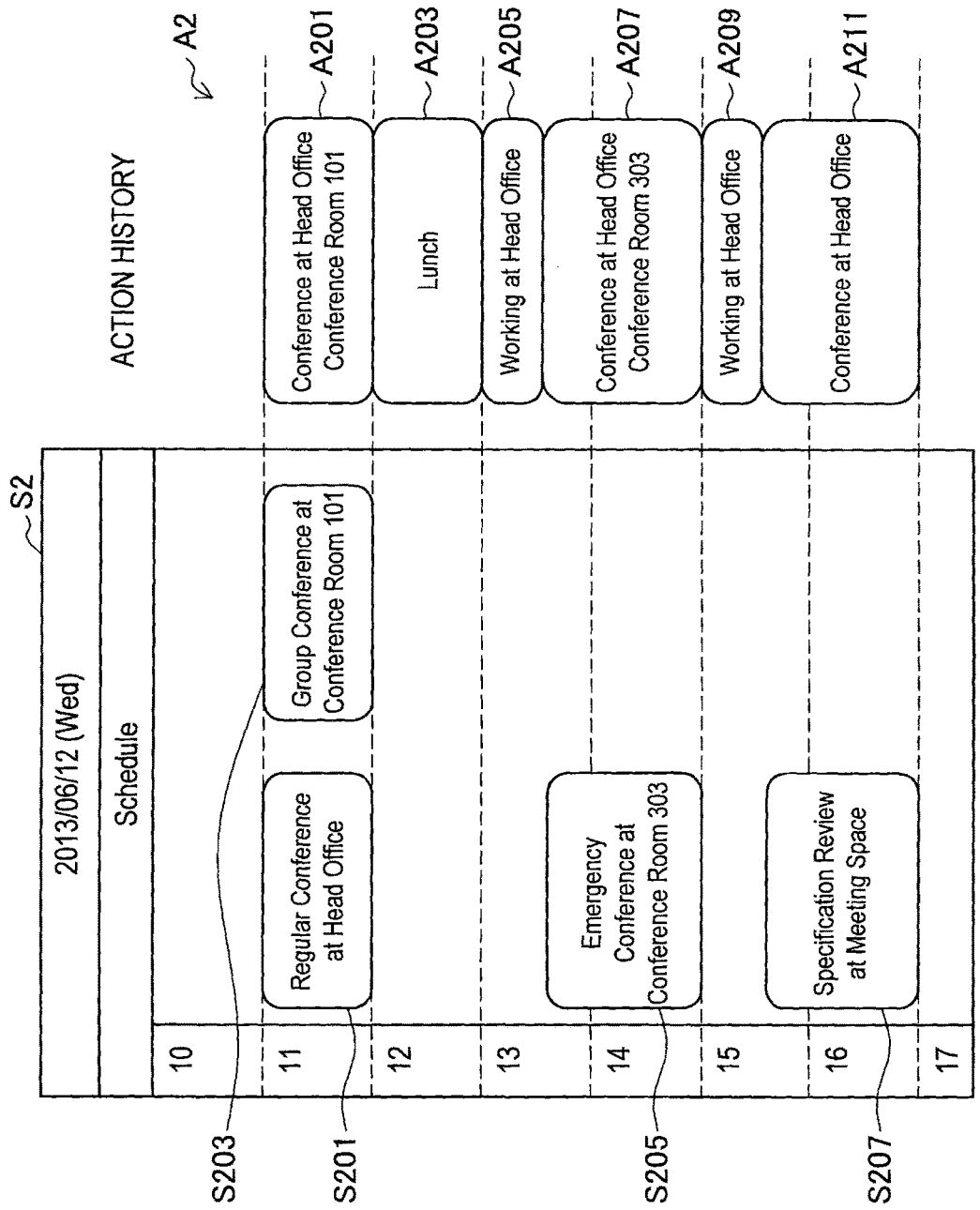
FIG. 8 is a diagram showing a second example of detailed processing according to a first embodiment of the present disclosure.
Figure 9:
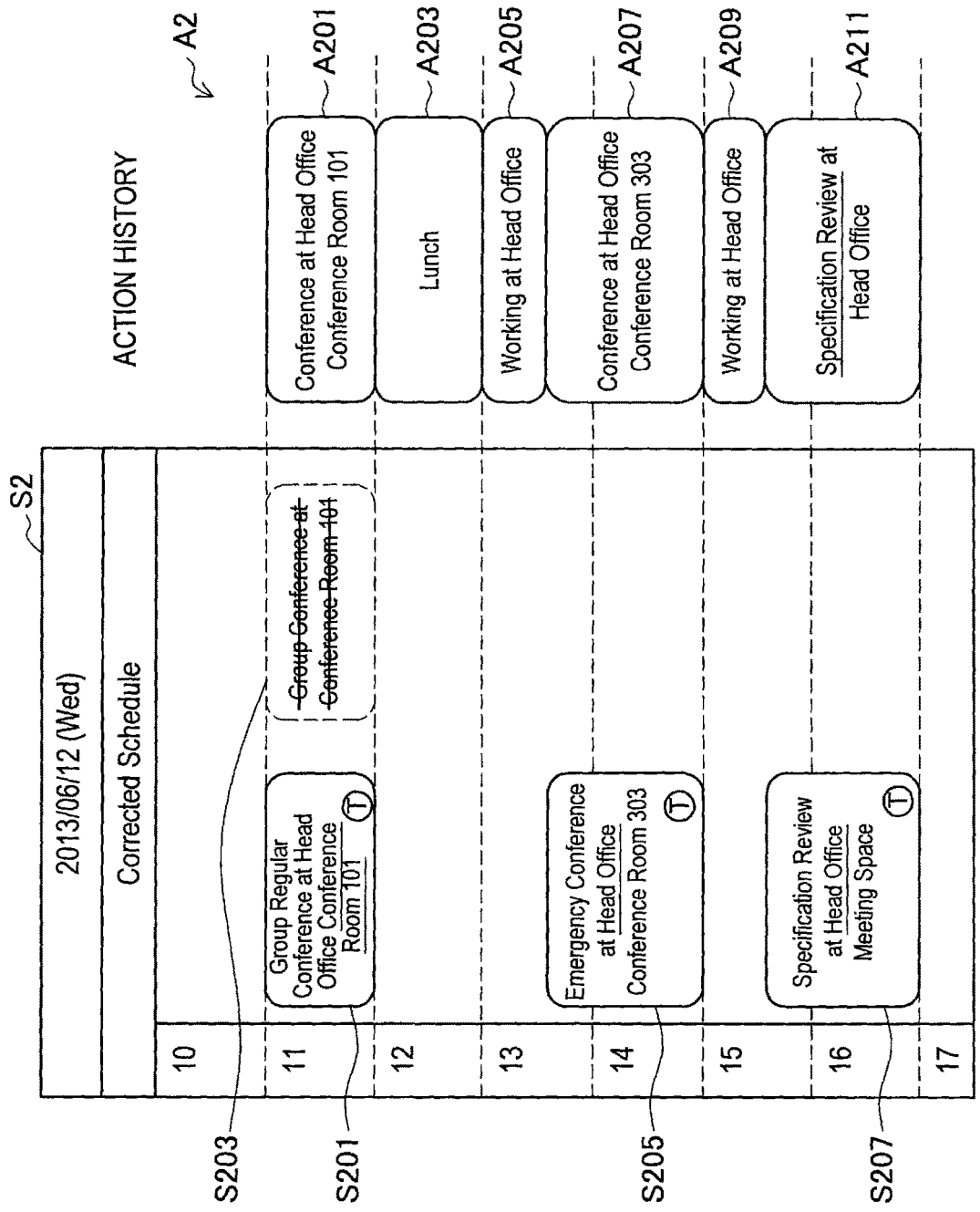
FIG. 9 is a diagram showing a second example of detailed processing according to a first embodiment of the present disclosure.

FIGS. 8 and 9 are diagrams showing a second example of detailed processing according to a first embodiment of the present disclosure. FIG. 8 shows a past schedule and action history before correction, and FIG. 9 shows the corrected past schedule and corrected action history.

Referring to FIG. 8, event information S201 to S207 are registered in a past schedule S2. In addition, action histories A201 to A211 are registered in an action history A2. In the past schedule S2, the event information S201 (Regular Conference at Head Office from 11:00 to 12:00) competes with the event information S203 (Group Conference at Conference Room 101 from 11:00 to 12:00).

The past-schedule correction function (F105) corrects the past schedule S2, and the action-history correction function (F109) corrects the action history A2. The result is shown in FIG. 9.

Referring to FIG. 9, the conflict resolution function (F1051) included in the past-schedule correction function (F105) resolves the competition among the event information S201 and S203, and integrates the event information S203 into the event information S201. For example, by using a processing result of the writing-variation resolution function (F1057), the conflict resolution function (S1051) determines that a place "Head Office Conference Room 101" of the action history A201 means the same as a place "Head Office" of the original event information S201 and a place "Conference Room 101" of the event information S203. As a result, the conflict resolution function (F1051) can recognize the event information S201 and the event information S203 as the event information that mean the same event.

Further referring to FIG. 9, the writing-variation resolution function (F1057) corrects place information "Conference Room 303" included in the event information S205 to "Head Office Conference Room 303" on the basis of the action history A207. In addition, place information "Meeting Space" included in the event information S207 is corrected to "Head Office Meeting Space" on the basis of the action history A211. On the other hand, in the action history A2, the action-history correction function (F109) corrects a user action "Conference" included in the action history A211 to a more detailed description "Specification Review" acquired from the event information S207.

In the first embodiment described above, the past schedule registered by the user is corrected on the basis of the action history of the user. The corrected past schedule itself is useful as information indicating past actions of the user. In addition, by correcting the action history on the basis of the corrected past schedule, a lacking part of the action history may be complemented, and a label of an action may be specified, the label being difficult to be recognized depending on an action recognition based on sensor information and being recognized by the user.

( 2. Second Embodiment)

Next, a second embodiment of the present disclosure is explained. Detailed explanation of a system configuration of the second embodiment is omitted because the system configuration of the second embodiment is similar to the system configuration of the first embodiment. In addition, some functional configurations have substantially the same function as that of the first embodiment. Accordingly, the some functional configurations are denoted with the same reference numerals, and repeated explanation of these functional configurations is omitted.

(2-1. Functional Configuration)

Figure 10:
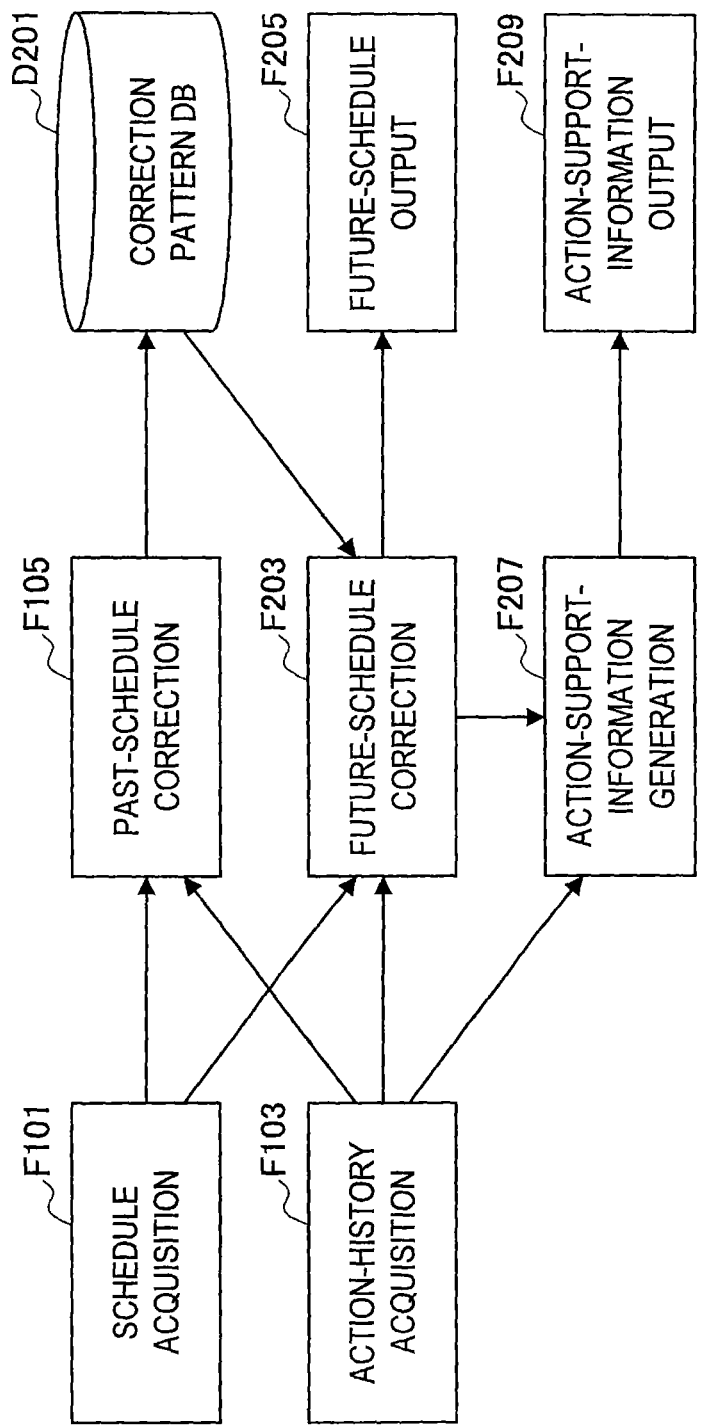
FIG. 10 is a block diagram showing a schematic functional configuration of an information processing system according to a second embodiment of the present disclosure.

FIG. 10 is a block diagram showing a schematic functional configuration of an information processing system according to a second embodiment of the present disclosure. Referring to FIG. 10, the present embodiment achieves a schedule acquisition function (F101), an action-history acquisition function (F103), a past-schedule correction function (F105), a future-schedule correction function (F203), an action-support-information generation function (F207), and an action-support-information output function (F209). In addition, a correction pattern DB (D101) is formed and referred appropriately in this embodiment.

The all functions F101 to F105 and F203 to F209 may be achieved by the processor 102 of the client device 100 or by the processor 202 of the server device 200. On the other hand, some of the functions F101 to F105 and F203 to F209 may be achieved by the processor 102 of the client device 100, and the other functions may be achieved by the processor 202 of the server device 200. In this case, the processor 102 and the processor 202 cooperate with each other through a network communication. In the case where the server 20 includes a plurality of server devices 200, at least some of the functions F101 to F105 and F203 to F209 may be achieved by being dispersed to the plurality of server devices 200, or one of the server devices 200 may be achieved the plurality of functions.

The correction pattern DB (D101) may be stored in the storage 106 of the client device 100, or may be stored in the storage 206 of the server device 200, for example.

Figure 11:
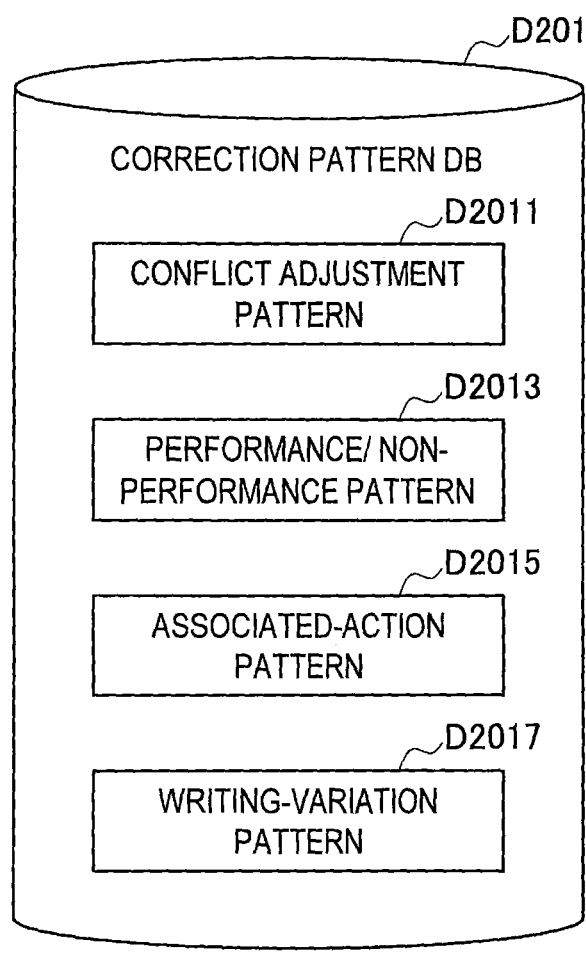
FIG. 11 is a diagram showing details of a correction pattern DB according to a second embodiment of the present disclosure.

In the correction pattern DB (D101), correction patterns are accumulated as data, the correction patterns being generated on the basis of results that the past-schedule correction function (F105) corrects the past schedule on the basis of the action history of the user acquired by the action-history acquisition function (F103). FIG. 11 shows details of the correction pattern DB (D201). For example, the correction pattern DB (D201) may include a conflict adjustment pattern (D2011), execution/non-execution pattern (D2013), an associated-action pattern (S2015), and a writing-variation pattern (D2017). Details of these data are described below.

In the conflict adjustment pattern (D2011), information about a correction pattern is recorded, the correction pattern being extracted from a correction result obtained by the conflict resolution function (F1051) of the past schedule correction function (F105). For example, in the example explained with reference to FIGS. 6 and 7, the event information S103 is determined as the information about the executed event among the competing event information S101 and S103. Here, if the event information S101 is event information (hereinafter, also referred as repeating event information) of a periodically-repeating event (regular conference) and the event information S103 is event information (hereinafter, also referred as one-time event information) of an event (emergency conference) performed just one time, the conflict adjustment pattern (D2011) records a correction pattern that "in the case where repeating event information and one-time event information compete with each other, the one-time event information is prioritized".

In addition, a correction pattern that "event information including a word 'emergency' is prioritized" or a correction pattern that "event information whose event is held at a place different from a place (Shinagawa) where the user usually works is prioritized" may be derived from the above correction and recorded in the conflict adjustment pattern (D2011). If the conflict resolution function (F1051) repeatedly performs competition resolutions of schedule information, accuracy of the conflict adjustment pattern (D2011) can be improved. For example, in the case where a correction pattern adapted to certain processing is not adapted to another processing, the correction pattern recorded in the conflict adjustment pattern (D2011) is deleted, or a value of reliability that is set separately may be lowered.

The performance/non-performance pattern (D2013) records information about correction patterns extracted from correction results from performance determination function (F1053) of the past-schedule correction function (F105). For example, in the example explained with reference to FIGS. 6 and 7, it is determined that the event corresponding to the event information S105 was not performed. On the basis of this correction result, the performance/no-performance pattern (D2013) may record a correction pattern that "in the case where an event held at a place different from a place (Shinagawa) where the user usually works is performed in the morning, an event held at lunchtime is not performed", for example. For another example, the performance/non-performance pattern (D2013) may record a correction pattern that "in the case where an event of the repeating event information set in the morning is not performed, an event at lunchtime also is not performed".

The associated-action pattern (D2015) records information about a correction pattern extracted from a correction result from the associated-action complement function (F1055) of the past-schedule correction function (F105). For example, in the example explained with reference to FIGS. 6 and 7, the event information S109 is complemented as the associated action of the event information S107. On the basis of this correction result, the associated-action pattern (D2015) may record a correction pattern that "in the case where the user visits a client from a place (Shinagawa) where the user usually works, a transfer event occurs as an associated action". In addition, the associated-action pattern (D2015) may record an achievement of the associated action. In the above example, in addition to the correction pattern, information indicating that "time necessary for a transfer event to visit a client in Minami-ku, Yokohama from Shinagawa is substantially one hour" may be recorded, for example.

The writing-variation pattern (D2017) records information about a correction pattern extracted from the correction result of the writing-variation resolution function (F1057) on the past-schedule correction function (F105). In the example explained with reference to FIGS. 8 and 9, the writing variations of "Head Office" and "Conference Room 101" respectively in the event information S201 and S203 are corrected to "Head Office Conference Room 101". On the basis of this result, for example, the writing-variation pattern (D2017) may record a correction pattern that "'Head Office' (in the case of a conference) and 'Conference Room 101' mean 'Head Office Conference Room 101'". Note that, the writing-variation resolution function (F1057) uses the action history of the user so as to recognize a case where different words mean the same. However, a correction pattern to be recorded in the writing-variation pattern (D2017) is not necessarily recorded in association with the action history.

Figure 12:
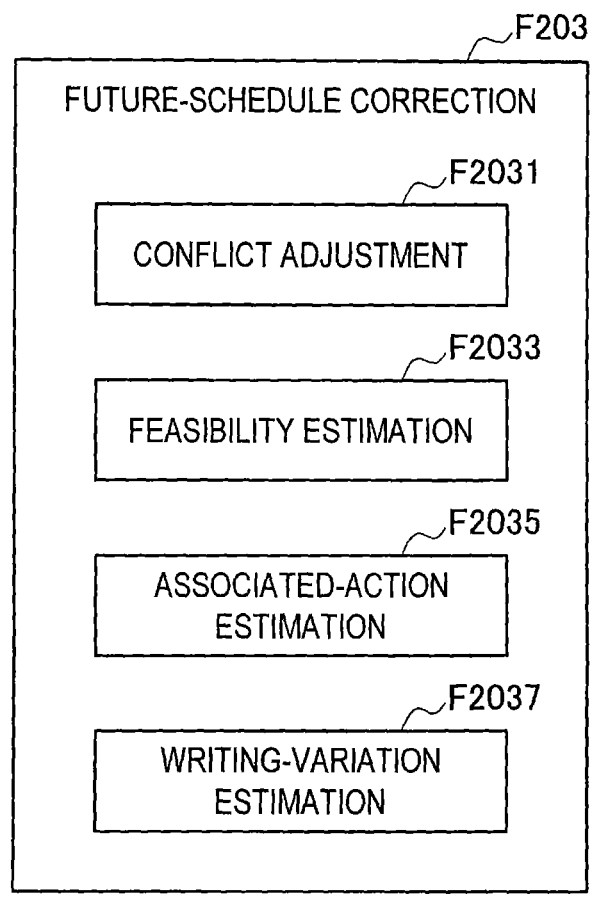
FIG. 12 is a diagram showing details of a future-schedule correction function according to a second embodiment of the present disclosure.

Referring to FIG. 10 again, on the basis of a latest action history of the user acquired by the action-history acquisition function (F103) and a correction pattern recorded in the correction pattern DB (D201), the future-schedule correction function (F203) corrects a future schedule acquired by the schedule acquisition function (F101). FIG. 12 shows details of the future-schedule correction function (F203). The future-schedule correction function (F203) may include a conflict adjustment function (F2013), a feasibility estimation function (F2033), an associated-action estimation function (F2035), and a writing-variation estimation function (F2037), for example. Further explanations of these functions are provided below.

In the case where pieces of event information included in a future schedule compete with each other, the conflict adjustment function (F2031) estimates which event information corresponds to an event having highest feasibility among the event information on the basis of the conflict adjustment pattern (D2011) and a user location estimated from the latest action history of the user. Note that, as a result of feasibility estimation function (F2033) described later, it is possible that all events are estimated as low feasibility. In addition, it may be possible for the conflict adjustment function (F2031) to estimate that pieces of event information that compete with each other in a future schedule mean a same event actually and to resolve the competition by integrating the event information. A processing result of the writing-variation estimation function (F2037) described later may be utilized for recognition of the event information that mean the same event.

The feasibility estimation function (F2033) estimates feasibilities of events corresponding to event information included in the future schedule on the basis of locations included as conditions or content in the performance/non-performance pattern (D2013) and a latest user location indicated by the action history of the user. Since the events are registered in the schedule, all events corresponding to the event information have possibility to be performed. However, by estimating its feasibilities based on past achievements and user locations indicated in the performance/non-performance pattern (D2013), it may be possible to differentiate among degrees of notifications in action support information as described later.

The associated-action estimation function (F2035) adds, to the future schedule, second event information corresponding to a second event (associated action) that is expected to occur in association with a first event corresponding to first event information included in the future schedule. For example, the second event (associated action) may be a transfer to a place where the first event is held or preparation of a material for the first event (conference, for example). The associated-action estimation function (F2035) may compare a latest user location indicated in the action history with a starting location of the second event (associated action) included in the associated-action pattern (D2015), and may determine whether or not the second event information is added to the future schedule. In the case where the second event information is merely added in accordance with the associated-action pattern (D2015), an inappropriate associated action may be estimated on the basis of an irregular user action (although the user usually visits a client in Yokohama from Shinagawa, the user is already in Yokohama today because of another business), for example. Accordingly, the associated-action estimation function (F2035) further refers the latest user location indicated in the action history of the user for estimating the associated action.

The writing-variation estimation function (F2037) resolves a writing variation in the event information included in the future schedule by estimating on the basis of the writing-variation pattern (D2017). By resolving the writing variation, words in the future schedule presented to the user is integrated, the event information is complemented, and the action support information described later is generated on the basis of more detailed content or place of the event.

Referring to FIG. 10 again, the future-schedule output function (F205) outputs a future schedule corrected by the future-schedule correction function (F203). The corrected future schedule may be displayed on the display 110 of the client device 100, and may be referred when the user checks action plans, for example. In the case where the action-support-information generation function (F207) described later is achieved, the future-schedule output function (F205) does not have to achieved, or the both functions may be achieved.

Figure 13:
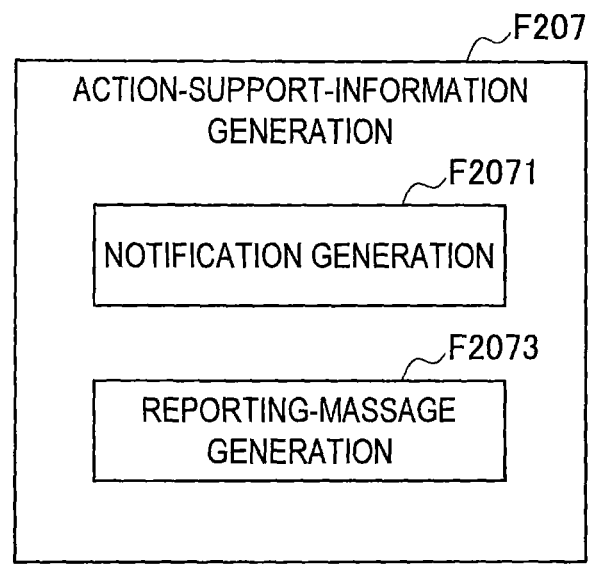
FIG. 13 is a diagram showing details of an action-support-information generation function according to a second embodiment of the present disclosure.

On the basis of the future schedule corrected by the future-schedule correction function (F203) and the latest action history of the user acquired by the action-history acquisition function (F103), the action-support-information generation function (F207) generates action support information to be provided to the user. FIG. 13 shows details of the action-support-information generation function (F207). For example, the action-support-information generation function (F207) includes a notification generation function (F2071) and a reporting-massage generation function (F2073). Details of these functions are explained as follows.

Figure 14:
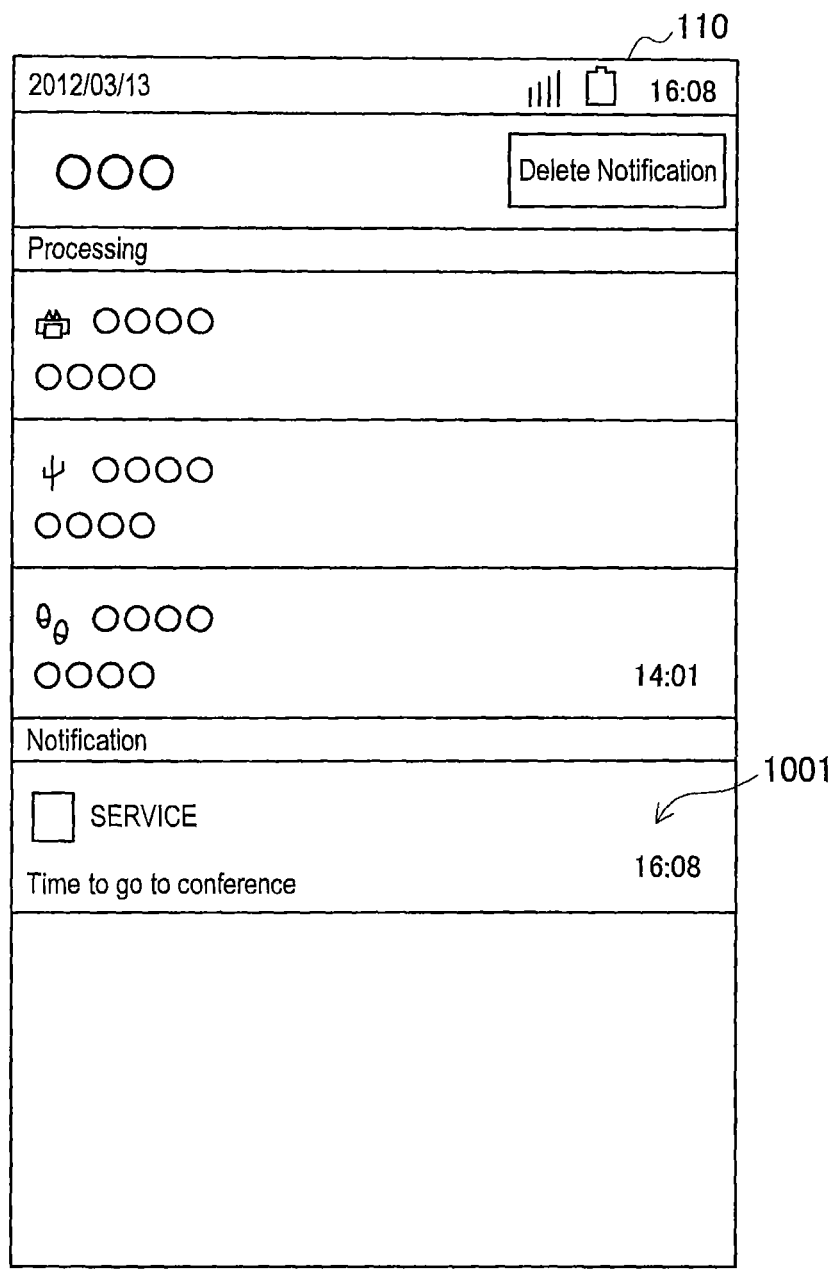
FIG. 14 is a diagram showing an example of notification according to a second embodiment of the present disclosure.

For example, on the basis of the future schedule and the latest action history of the user, the notification generation function (F2071) generates a notification to perform an action along the event information included in the schedule. FIG. 14 shows an example of the notification. A notification 1001 displayed on the display 110 of the client device 100 may urge the user to perform an action for the next event.

In the case where there is a gap between the future schedule and the latest action history of the user, the reporting-massage generation function (F2073) generates a reporting massage to notify other users of unfeasibleness of the event information included in the schedule.

Referring to FIG. 10 again, the action-support-information output function (F209) outputs the action support information generated by the action-support-information generation function (F207). For example, the action support information is a notification generated by the notification generation function (F2071), and may be displayed on the display 110 on the client device 100 as shown in FIG. 14. In addition, the notification may be output as sound from the speaker 116 of the client device 100, or may be output as vibration from a vibrator installed as another output device, for example. For another example, the action support information is a reporting massage generated by the reporting-massage generation function (F2073), and may be output to another client device through the communication module 108 of the client device 100.

(2-2. Example of Detailed Processing)
(First Example)

Figure 15:
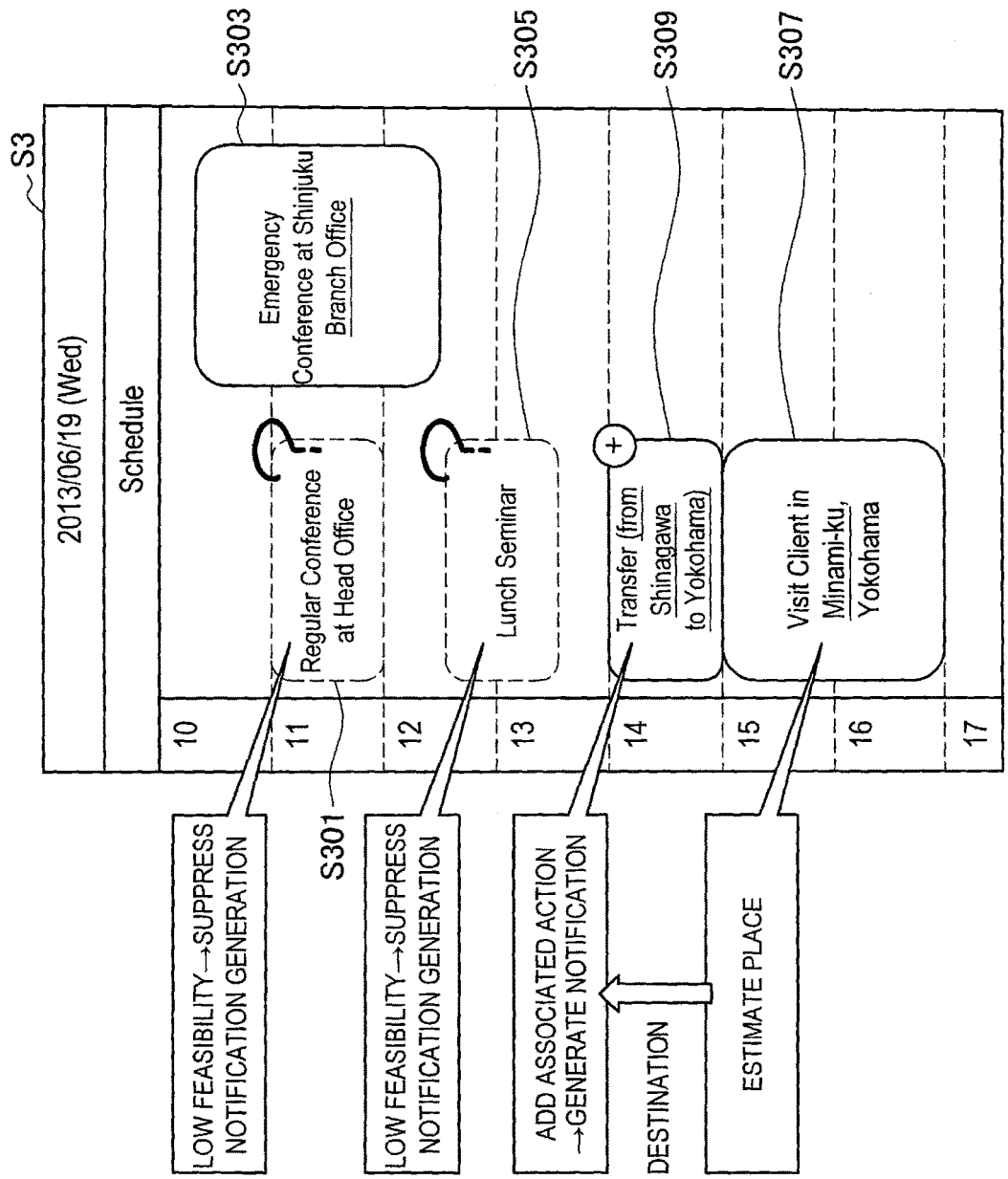
FIG. 15 is a diagram showing a first example of detailed processing according to a second embodiment of the present disclosure.

FIG. 15 is a diagram showing a first example of detailed processing according to the second embodiment of the present disclosure. Referring to FIG. 15, the event information S301 to S307 are registered in the future schedule S3. In the schedule S3, the event information S301 (Regular Conference at Head Office from 11:00 to 12:00) and the event information S303 (Emergency Conference in Shinjuku from 10:30 to 12:30) compete with each other.

When the future schedule correction function (F203) corrects the future schedule S3, the conflict adjustment function (F2031) first adjusts the competition among the event information S301 and the event information S303. If the conflict adjustment pattern (D2011) of the correction pattern DB (D201) records a correction pattern based on the correction result such as the example (the event information S103 (emergency conference) is determined as information about the performed event from among the competing event information S101 (regular conference) and S103 (emergency conference)) explained with reference to FIGS. 6 and 7, the conflict adjustment function (F2031) may determine that not the event (regular conference) of the event information S301 but the event (emergency conference) of the event information S303 is performed also in the future schedule S3 on the basis of the correction pattern.

However, in this case, a determination result of the conflict adjustment function (F2031) is just an estimate. Accordingly, the event (regular conference) of the event information S301 is merely determined as "low feasibility". That is, the event information S301 remains in the future schedule S3 and is treated as an event having low feasibility. For example, generation of a notification by the notification generation function (F2071) of the action-support-information generation function (F207) and generation of a reporting massage by the reporting-massage generation function (F2073) may be suppressed.

In the case where the above estimate is correct, it is highly possible the user attends an emergency conference relating to the event information S303, accordingly a notification of the regular conference relating to the event information S301 is not necessary, and other users to attend the regular conference relating to the event information S301 recognize the absence of the user in the regular conference. That is, the action-support-information generation function (F207) generates the action support information on the basis of the future schedule corrected by the future-schedule correction function (F203), and accordingly generation of a notification and a reporting massage unnecessary for the user himself/herself or other users can be suppressed.

In the case of correcting the future schedule S3, the feasibility estimation function (F2033) estimates feasibilities of respective event information. If the performance/non-performance pattern (D2013) of the correction pattern DB (D201) records a correction pattern based on the correction result such as the example (it is determined that the event (lunch seminar) corresponding to the event information S105 is not performed) explained with reference to FIGS. 6 and 7, the feasibility estimation function (F2033) may determine that the event (lunch seminar) corresponding to the event information S305 also has low feasibility in the future schedule S3 on the basis of the correction pattern.

In a similar way to the event information S301, the event information S305 remains in the future schedule S3 and is treated as an event having low feasibility. For example, generation of a notification by the notification generation function (F2071) of the action-support-information generation function (F207) and generation of a reporting massage by the reporting massage generation function (F2073) may be suppressed.

In addition, in the case of correcting the future schedule S3, the associated-action estimation function (F2035) estimates an associated-action of respective event information. If the associated-action pattern (D2015) of the correction pattern DB (D201) records a correction pattern based on the correction result such as the example (the event information S109 (transfer from Shinagawa to Yokohama) is complemented as an associated action relating to the event information S107 (visit client)) explained with reference to FIGS. 6 and 7, and the user is in a location (Shinagawa in the above example) appropriate to the assumed associated action in accordance with the latest action history of the user, the associated-action correction function (F2035) may complement the event information S309 (transfer from Shinagawa to Yokohama) before the event information S307 in the future schedule S3.

In the shown example, by the associated-action estimation function (F2035), it becomes clear that performing the event relating to the event information S309 (transfer from Shinagawa to Yokohama) is necessary before performing the event relating to the event information S307 (visit client) registered by the user in the future schedule S3, in order to perform the event relating to the event information S307. That is, the notification generation function (F2071) of the action-support-information generation function (F207) generates a notification to urge the user to transfer as shown in FIG. 14, the action-support-information output function (F209) outputs the notification through the display 100 of the client device 100, and accordingly the action-support-information generation function can support the user to take an appropriate action.

In the case of correcting the future schedule S3, the writing-variation estimation function (F2037) resolves writing variations in respective event information on the basis of writing-variation patterns (D2017) of the correction pattern DB (F201). In the shown example, the place "Shinjuku" in the event information S303 is corrected to "Shinjuku Branch Office", and the place "Yokohama" in the event information S307 is corrected to "Minami-ku, Yokohama". By such corrections, a place where the event relating to the event information S307 is performed, in other ward, a destination of the user, can be accurately estimated, and the event information S309 for the transfer can be complemented by the associated-action estimation function (F2035) as described above.

(Second Example)

Figure 16:
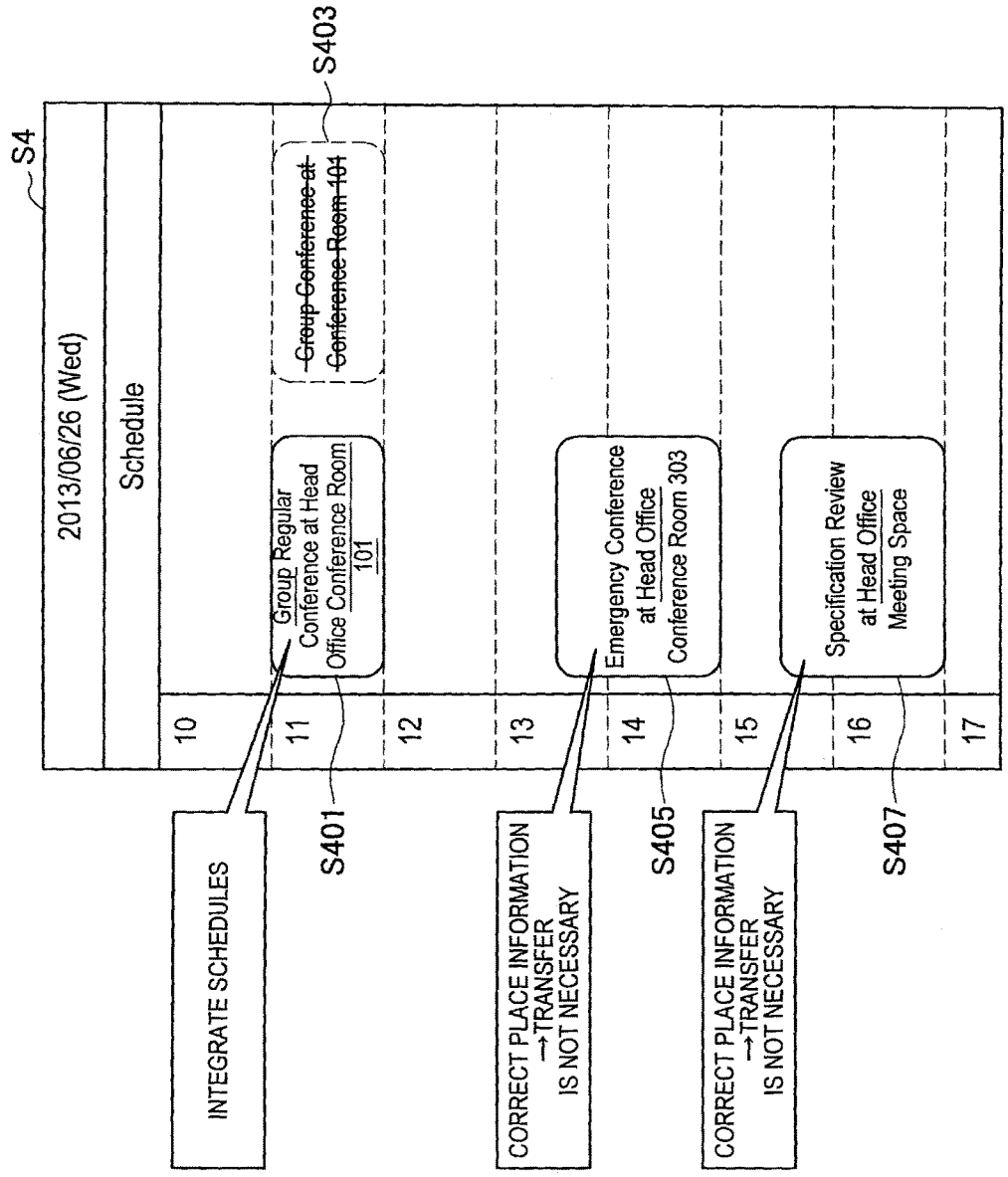
FIG. 16 is a diagram showing a second example of detailed processing according to a second embodiment of the present disclosure.

FIG. 16 is a diagram showing a second example of detailed processing according to the second embodiment of the present disclosure. Referring to FIG. 16, the event information S401 to S407 are registered in the future schedule S4. In the schedule S4, the event information S401 (Regular Conference at Head Office from 11:00 to 12:00) and the event information S403 (Group Conference at Conference Room 101 from 11:00 to 12:00) compete with each other.

When the future schedule correction function (F203) corrects the future schedule S4, the conflict adjustment function (F2031) first adjusts the competition among the event information S401 and S403. First of all, if the writing-variation estimation function (F2037) estimates that both a place "Head Office" in the event information S401 and a place "Conference Room 101" in the event information S403 means "Head Office Conference Room 101", it is understood that both conferences are held in the same conference room at the same time. Accordingly, the conflict adjustment function (F2031) integrates the event information S403 into the event information S401, and the competition among the event information can be resolved.

Alternatively, if the writing-variation estimation function (F2037) estimates that both content "Regular Conference" in the event information S401 and content "Group Conference" in the event information S403 means "Group Regular Conference", the conflict adjustment function (F2031) can integrate the event information S403 into the event information S401, and the competition among the event information can be resolved even if there is a time lag between the two event information (in the case where pieces of event information relating to the same event are respectively registered by different users, starting times often match with each other, but ending times often differ with each other).

In addition, in the case of correcting the future schedule S4, the writing-variation estimation function (F2037) further resolves writing variations in respective event information on the basis of the writing-variation pattern (D2017) of the correction pattern DB (D201). In addition to the writing-variation resolution in the event information S401 and S403, a place "Conference Room 303" in the event information S405 is corrected to "Head Office Conference Room 303", and a place "Meeting Space" in the event information S407 is corrected to "Head Office Meeting Space". By such corrections, it becomes clear that both places where the event information S405 and S407 are performed are "Head Office", and that the associated-action estimation function (F2035) does not have to complement new event information indicating transfer to a venue of an event, for example.

(3. Supplemental Remarks)

The embodiments of the present disclosure may include the above described information processing device (client device or server device), system, information processing method performed by the information processing device or the system, a program for causing the information processing device to function, and a tangible non-transitory medium having the program stored therein.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing device including:
  a schedule acquisition unit configured to acquire a schedule registered by a user;
  an action-history acquisition unit configured to acquire an action history of the user; and
  a past-schedule correction unit configured to correct a past schedule among the schedule on the basis of the action history.

(2) The information processing device according to (1),
  wherein, on the basis of the action history, the past-schedule correction unit determines whether or not event information included in the past schedule corresponds to an actually-performed event, and deletes or nullifies, in the past schedule, the event information corresponding to an event that is not actually performed.

(3) The information processing device according to (2),
  wherein, in a case where pieces of the event information compete with each other, the past-schedule correction unit determines which event information corresponds to the actually-performed event among the pieces of competing event information.

(4) The information processing device according to (2) or (3),
  wherein the past-schedule correction unit compares a user location indicated by the action history with a location indicated by the event information, and thereby determines whether or not the event information corresponds to the actually-performed event.

(5) The information processing device according to any one of (1) to (4),
  wherein the past-schedule correction unit adds, to the past schedule, second event information corresponding to a second event that occurs in association with a first event corresponding to first event information included in the past schedule.

(6) The information processing device according to any one of (1) to (5),
  wherein the past-schedule correction unit resolves a writing variation in event information included in the past schedule.

(7) The information processing device according to (6),
  wherein the past-schedule correction unit compares a location or event content that is indicated by the action history with a location or event content that is indicated by the event information, and thereby resolves a writing variation in the event information.

(8) The information processing device according to any one of (1) to (7), further including:
  a past-schedule output unit configured to output the corrected past schedule.

(9) The information processing device according to (1), further including:
  a future-schedule correction unit configured to correct a future schedule among the schedule on the basis of at least a correction pattern of the past schedule.

(10) The information processing device according to (9),
  wherein the future-schedule correction unit estimates a feasibility of an event corresponding to event information included in the future schedule.

(11) The information processing device according to (10), further including:
  an action-support-information generation unit configured to generate action support information for the user on the basis of the corrected future schedule and the action history,
  wherein the action-support-information generation unit suppresses generation of the action support information for event information corresponding to an event having low feasibility.

(12) The information processing device according to (10) or (11),
  wherein, in a case where pieces of the event information compete with each other, the future-schedule correction unit estimates which event information corresponds to an event having highest feasibility among the pieces of competing event information.

(13) The information processing device according to any one of (10) to (12),
  wherein the future-schedule correction unit corrects the future schedule further on the basis of the action history, compares a latest user location indicated by the action history with a location included as a condition in the correction pattern, and thereby estimates the feasibility.

(14) The information processing device according to any one of (9) to (13),
  wherein the future-schedule correction unit adds, to the future schedule, second event information corresponding to a second event that is expected to occur in association with a first event corresponding to first event information included in the future schedule.

(15) The information processing device according to (14),
  wherein the second event is a transfer event to a place of the first event, and
  wherein the future-schedule correction unit corrects the future schedule further on the basis of the action history, compares a latest user location indicated by the action history with a starting location of the transfer event included in the correction pattern, and thereby determines whether or not the second event information is added to the future schedule.

(16) The information processing device according to any one of (9) to (15),
  wherein the future-schedule correction unit resolves a writing variation in event information included in the future schedule.

(17) The information processing device according to any one of (9) to (16),
  wherein the future-schedule correction unit corrects the future schedule further on the basis of the action history.

(18) The information processing device according to any one of (9) to (17), further including:
  a future-schedule output unit configured to output the corrected future schedule.

(19) An information processing method including:
  acquiring a schedule registered by a user;
  acquiring an action history of the user; and
  correcting, by a processor, a past schedule among the schedule on the basis of the action history.

(20) A program for causing a computer to achieve:
acquiring a schedule registered by a user;
acquiring an action history of the user; and
correcting a past schedule among the schedule on the basis of the action history.

What is claimed is:

1. An information processing device comprising:
a memory;
a display including a touch sensor to acquire a touch operation by a user;
a speaker;
a GPS sensor; and
processing circuitry configured to
acquire a schedule registered by the user, the schedule being inputted by the user using at least the touch sensor;
acquire an action history of the user using at least the GPS sensor;
correct a past schedule among the schedule based on the action history, wherein the past schedule comprises events that have already been completed and the end of the past schedule as originally registered by the user predates the correction of the past schedule;
store, in the memory, a correction pattern of the past schedule;
estimate a feasibility of a future event corresponding to event information included in a future schedule among the schedule based on the correction pattern stored in the memory;
add, to the future schedule, second event information corresponding to a second event that is expected to occur in association with a first event corresponding to first event information included in the future schedule, the second event being a transfer event from a latest user location to a place of the first event;
compare the latest user location indicated by the action history with a starting location of the transfer event included in the correction pattern, the latest user location being acquired by the GPS sensor;
determine whether or not to add the second event information to the future schedule based on the comparison of the latest user location with the starting location of the transfer event such that the second information is not added to the future schedule in a case where it is determined that the latest user location is different from the starting location; and
output, using at least the display and the speaker, action support information for supporting an action by the user regarding a future event, while suppressing generation of the action support information for a future event estimated to have low feasibility, the action support information including a notification to the user regarding the transfer event to urge the user to transfer from the latest user location to the place of the first event in a case where the second event information is determined to be added to the future schedule based on the comparison of the latest user location with the starting location of the transfer event.

2. The information processing device according to claim 1,
wherein, based on the action history, the processing circuitry is configured to determine whether or not event information included in the past schedule corresponds to an actually-performed event, and deletes or nullifies, in the past schedule, the event information corresponding to an event that is not actually performed.

3. The information processing device according to claim 2,
wherein, in a case where pieces of the event information compete with each other, the processing circuitry determines which event information corresponds to the actually-performed event among the pieces of competing event information.

4. The information processing device according to claim 2,
wherein the processing circuitry is configured to compare a user location indicated by the action history with a location indicated by the event information, and thereby determine whether or not the event information corresponds to the actually-performed event.

5. The information processing device according to claim 1,
wherein the processing circuitry is configured to add, to the past schedule, second event information corresponding to a second event that occurs in association with a first event corresponding to first event information included in the past schedule.

6. The information processing device according to claim 1,
wherein the processing circuitry is configured to resolve a writing variation in event information included in the past schedule.

7. The information processing device according to claim 6,
wherein the processing circuitry is configured to compare a location or event content that is indicated by the action history with a location or event content that is indicated by the event information, and thereby resolve a writing variation in the event information.

8. The information processing device according to claim 1,
wherein the processing circuitry is configured to output the corrected past schedule.

9. The information processing device according to claim 1, wherein the processing circuitry is configured to correct the future schedule correction pattern of the past schedule.

10. The information processing device according to claim 9,
wherein the processing circuitry is configured to resolve a writing variation in event information included in the future schedule.

11. The information processing device according to claim 9,
wherein the processing circuitry is configured to correct the future schedule further on the basis of the action history.

12. The information processing device according to claim 9,
wherein the processing circuitry is configured to output the corrected future schedule.

13. The information processing device according to claim 1,
wherein, in a case where pieces of the event information compete with each other, the processing circuitry estimates which event information corresponds to an event having highest feasibility among the pieces of competing event information.

14. The information processing device according to claim 1,
wherein the processing circuitry is configured to correct the future schedule further on the basis of the action history, compare the latest user location indicated by the action history with a location included as a condition in the correction pattern, and thereby estimate the feasibility.

15. The information processing device according to claim 1, wherein the action support information is a message displayed on the display, or a sound output from the speaker.

16. An information processing method comprising:
acquiring a schedule registered by a user, the schedule being inputted by the user using at least a touch sensor included in a display;
acquiring an action history of the user using at least the GPS sensor;
correcting, using processing circuitry, a past schedule among the schedule based on the action history, wherein the past schedule comprises events that have already been completed and the end of the past schedule as originally registered by the user predates the correction of the past schedule;
storing, in a memory, a correction pattern of the past schedule;
estimating a feasibility of a future event corresponding to event information included in a future schedule among the schedule based on the correction pattern stored in the memory;
adding, to the future schedule, second event information corresponding to a second event that is expected to occur in association with a first event corresponding to first event information included in the future schedule, the second event being a transfer event from a latest user location to a place of the first event;
comparing the latest user location indicated by the action history with a starting location of the transfer event included in the correction pattern, the latest user location being acquired by the GPS sensor;
determining whether or not to add the second event information to the future schedule based on the comparison of the latest user location with the starting location of the transfer event such that the second information is not added to the future schedule in a case where it is determined that the latest user location is different from the starting location; and
outputting, using at least the display and a speaker, action support information for supporting an action by the user regarding a future event, while suppressing generation of the action support information for a future event estimated to have low feasibility, the action support information including a notification to the user regarding the transfer event to urge the user to transfer from the latest user location to the place of the first event in a case where the second event information is determined to be added to the future schedule based on the comparison of the latest user location with the starting location of the transfer event.

17. A non-transitory computer readable medium including executable instructions, which when executed by a computer cause the computer to execute an information processing method, the method comprising:
acquiring a schedule registered by a user, the schedule being inputted by the user using at least a touch sensor included in a display;
acquiring an action history of the user using at least the GPS sensor;
correcting a past schedule among the schedule based on the action history, wherein the past schedule comprises events that have already been completed and the end of the past schedule as originally registered by the user predates the correction of the past schedule;
storing, in a memory, a correction pattern of the past schedule;
estimating a feasibility of a future event corresponding to event information included in a future schedule among the schedule based on the correction pattern stored in the memory;
adding, to the future schedule, second event information corresponding to a second event that is expected to occur in association with a first event corresponding to first event information included in the future schedule, the second event being a transfer event from a latest user location to a place of the first event;
comparing the latest user location indicated by the action history with a starting location of the transfer event included in the correction pattern, the latest user location being acquired by the GPS sensor;
determining whether or not to add the second event information to the future schedule based on the comparison of the latest user location with the starting location of the transfer event such that the second information is not added to the future schedule in a case where it is determined that the latest user location is different from the starting location; and
outputting, using at least the display and a speaker, action support information for supporting an action by the user regarding e a future event, while suppressing generation of the action support information for a future event estimated to have low feasibility, the action support information including a notification to the user regarding the transfer event to urge the user to transfer from the latest user location to the place of the first event in a case where the second event information is determined to be added to the future schedule based on the comparison of the latest user location with the starting location of the transfer event.

* * * * *